Jan. 19, 1943.　　　E. W. DAVIS　　　2,308,865
LUBRICATING SYSTEM
Filed June 27, 1940　　　2 Sheets-Sheet 2
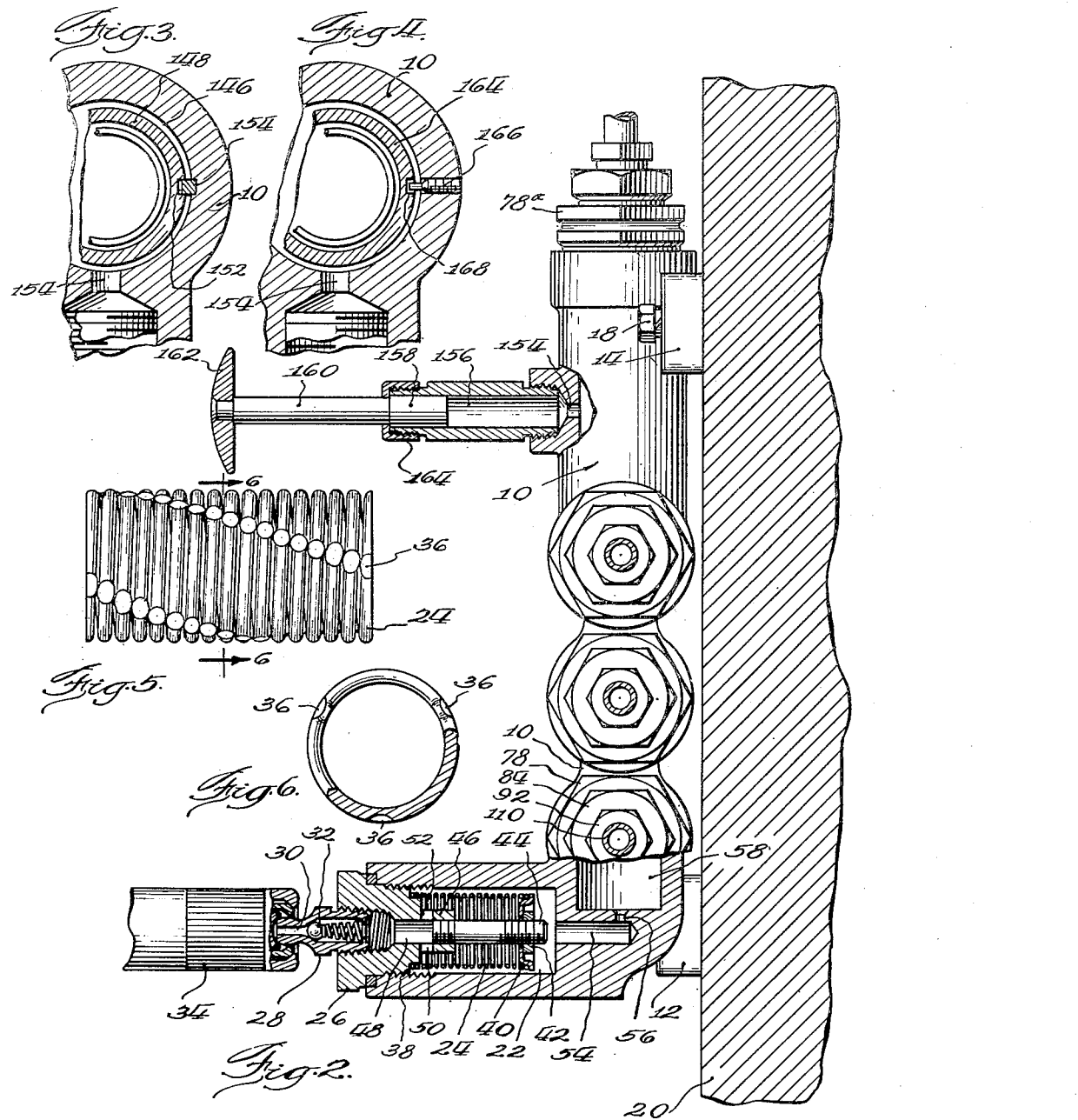

Patented Jan. 19, 1943

2,308,865

UNITED STATES PATENT OFFICE 2,308,865

LUBRICATING SYSTEM

Ernest W. Davis, Oak Park, Ill., assignor to Stewart-Warner Corporation, Chicago, Ill., a corporation of Virginia Application June 27, 1940, Serial No. 342,678

4 Claims. (Cl. 184—7)

My invention pertains to lubricating systems and more particularly to centralized lubricating systems of the progressive type, wherein grease is used as a lubricant.

A disadvantage of lubricating systems of the type heretofore used has been that such systems must be designed for each particular type of machine to which they are applied so that it has been impractical to manufacture and sell the several parts of such centralized systems for application in factories, machine shops, and other engineering plants to various types of machines there in use by mechanics not especially skilled in the design and installation of centralized lubricating systems.

An object of my invention is to provide a centralized lubricating system which may be readily applied to different types of machines by ordinary mechanics not especially skilled in the design and construction of centralized lubricating systems.

Another object of my invention is to provide a centralized lubricating system which may be supplied with grease from the conventional grease guns ordinarily used in every factory, machine shop, and other engineering plant.

Another object of my invention is to provide a centralized lubricating system which will accurately measure the proper quantities of lubricant supplied to each of the various bearings to which it is connected and which may be readily assembled in such manner as to provide each bearing with its proper requirement of lubricant.

Another object of my invention is to provide a centralized lubricating system which will operate efficiently over a long period of time and which will clearly indicate when the proper amount of lubricant has been supplied to the system by the lubricant compressor.

Another object of my invention is to provide a centralized lubricating system wherein the various parts of the system are protected from dirt and other impurities contained in the lubricant as supplied to the system.

Another object of my invention is to provide a centralized lubricating system which may be manufactured economically in large quantities and so designed that a relatively few interchangeable parts make the system adapted for application to a wide variety of industrial machinery.

Other objects and advantages will become apparent as the description proceeds.

In the drawings,

Figure 2 is a partially sectionalized view of the main part of my centralized lubricating system and is taken looking in the direction of the arrow 2 of Figure 1. This Figure 2 also illustrates the manner in which the lubricant compressor is connected to the lubricating system to supply grease thereto;

Figure 3 is a partial sectional view through one of the measuring valves and is taken on the line 3—3 of Figure 1;

Figure 4 is a view similar to Figure 3 but showing a modification thereof.

Figure 5 is an enlarged view of the grease strainer; and

Figure 6 is a sectional view of the strainer shown in Figure 5 and is taken on the line 6—6 of that figure.

Figure 1:
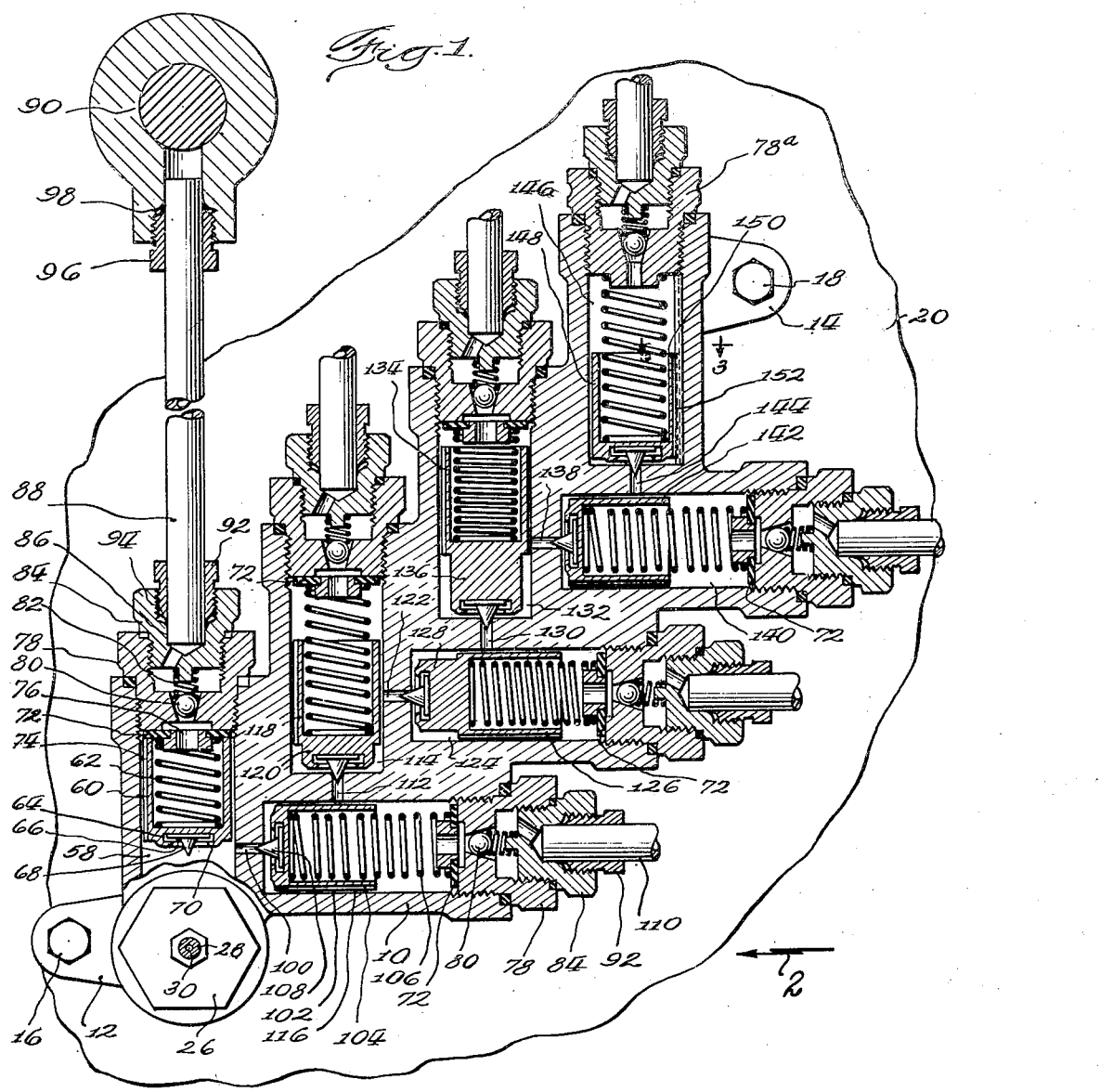
Figure 1 is a plan view partly in section of the main part of the centralized lubricating system and illustrates diagrammatically the manner in which this part of the lubricating system is connected to the several bearings.

Referring to the drawings, I have illustrated a preferred embodiment of my invention wherein I provide a casting 10 having ears 12 and 14 adapted to be attached by bolts 16 and 18 to the frame 20 of a machine or other suitable support. The casting 10 provides a chamber 22 in which the strainer 24 is located. The inlet end of this chamber 22 is closed by a plug 26 carrying a lubricant receiving nipple 28 having inlet passage 30 and the spring pressed ball check valve 32 preventing back flow through the inlet passage 30.

In Figure 2 I have illustrated the nipple 28 as being connected to the coupler 34 of a conventional lubricant compressor, such for example, as the conventional lever type hand operated compressor commonly used in factories, machine shops, and similar places for lubricating the bearings of the various pieces of machinery. It is to be understood, however, that any other suitable lubricant compressor or source of lubricant under pressure may be utilized to supply lubricant to my improved lubricating system by establishing a lubricant-tight connection between the lubricant receiving nipple 28 and such source of lubricant.

The lubricant strainer which I have illustrated consists of a coil spring as clearly shown in Figure 5. I preferably pass the coil spring between suitable rollers to flatten down the individual coils in three helical rows 36, spaced 120° apart so that the increased width of the individual coils at the points of flattening limit the degree to which the coils can be urged toward each other, as clearly indicated in Figure 5.

The strainer 24 is assembled as a unit with the plug 26 and is confined between a shoulder 38 of this plug and a washer 40 secured by nut 42 to one end of a threaded rod 44. The other end of the rod 44 is screwed into an extension 46 of the plug 26. In assembling the strainer on the plug 26 the nut 42 is tightened until the flat end portions 36 of the coils abut each other, whereupon the strainer 24 assumes the condition shown in Figure 5 and the spaces between the individual coils permit the passage of the grease therethrough but prevent the passage of particles of dirt or other impurities of sufficient size to interfere with the operation of the lubricating system or to injure the bearings supplied thereby.

The lubricant forced by the lubricant compressor through the nipple 28 passes into an axial passage 48 in the plug 26 and thence through lateral openings 50 and 52 into the interior of the strainer 24. The lubricant then passes through the spaces between the coils of the strainer 24 and into the chamber 22, from whence it flows through passages 54 and 56 to the first measuring valve chamber 58.

The measuring valve chamber 58 is cylindrical and contains a piston 60 urged by spring 62 toward the inlet end of the chamber. The piston 60 is provided with a recess 64 of slightly greater diameter than the cylindrical base 66 of valve 68 held in place by the curled-over edge 70 of the wall of the recess. This construction permits the valve 68 to shift laterally of the piston and to form an accurate seal with the inlet passage 56 and makes possible the use of greater manufacturing tolerances than would be permissible if the valve 68 were rigid with the piston 60.

In Figures 1 and 2 the piston 60 is shown in the position it assumes when the lower end of the chamber 58 has been pumped full of grease and the piston forced back against the resistance of its spring 62 until the rear end of the piston creates an effective seal with the gasket 72, thus cutting off all communication between the restricted passageway 74 in the piston and the outlet 76 of the measuring chamber. The gasket 72 is carried by a threaded plug 78 which forms a closure for the discharge end of the measuring chamber 58 and which forms a stop for the piston 60. A discharge check valve 80 is urged by spring 82 against a valve seat provided by the plug 78. The spring 82 is seated on a coupling member 84 having a recess 86 for receiving one end of a copper pipe 88, which serves to connect the measuring valve chamber 58 with the bearing indicated at 90.

The pipe 88 is secured to the coupling member 84 by a tubular nut 92 having a deformable lip 94 adapted to engage a cooperating part of the coupling member 84 and be compressed thereby to form a groove in the pipe 88 in a manner well understood in the art. The other end of the pipe 88 is similarly secured to the bearing 90 by a tubular nut 96 having a deformable lip 98.

When the piston 60 is in its normal position, the valve 68 closes the inlet 56 and the piston 60 cuts off communication between the measuring chamber 58 and the inlet 100 for the measuring chamber 102. When lubricant is forced into the measuring chamber 58 and the piston 60 forced into engagement with the sealing washer 72, the inlet 100 of the measuring chamber 102 is uncovered so that grease can be forced from the measuring chamber 58 into the inlet 100 and thence to the measuring chamber 102. The measuring chamber 102 is preferably identical with the measuring chamber 58 and is provided with a piston 104, spring 106, and inlet valve 108, which may be identical with the piston 60, spring 62, and valve 68 previously described.

The measuring chamber 102 is likewise closed by a plug 78 carrying a sealing washer 72 and is connected to its bearing by a pipe 110 secured to the plug 78 by compression coupling members 84 and 92. An outlet check valve 80 is also interposed between the measuring chamber 102 and the pipe 110 leading to the bearing.

In Figure 1, the piston 104 is shown in normal position with its valve 108 closing the inlet 100. In this position the piston 104 also cuts off communication between the chamber 102 and the inlet 112 of the next measuring chamber 114. When the piston 104 is in the piston shown, the inlet and outlet ends of the measuring chamber 102 are in communication by way of the restricted passage 116.

The measuring chamber 114 and the piping connections for conveying lubricant from this chamber to the bearing supplied by it are identical with those previously described. The piston 118 is likewise identical with the pistons 60 and 104, except that the closed end of the piston 118 is provided with a solid extension 120 which makes the piston longer. This longer piston has a shorter stroke since the measuring valve chamber 114 is the same length as the measuring valve chambers 58 and 102 and therefore the piston 118 supplies less lubricant to its bearing during its operative stroke than do the pistons 60 and 104.

The piston 118 controls communication between its measuring chamber 114 and inlet 122 for measuring valve chamber 124, which is identical in all respects with those previously described. The piston 126 is likewise identical with those previously described, except that the solid extension 128 is longer than the similar extension 120 on the piston 118 so that the piston 126 has a shorter stroke than does the piston 118.

The piston 126 controls communication between measuring valve chamber 124 and inlet 130 for measuring valve chamber 132 containing piston 134. The solid extension 136 on piston 134 is longer than the similar extension 128 on piston 126 and piston 134 has the shortest stroke of any of those shown in the drawings.

Piston 134 controls communication between measuring valve chamber 132 and inlet 138 for measuring valve chamber 140. The piston 142 is identical with the pistons 60 and 104 previously described and controls communication between measuring valve chamber 140 and inlet 144 for measuring valve chamber 146 containing piston 148.

The measuring valve chamber 146 may be identical with the measuring valve chambers previously described, and the piping connections for connecting this measuring valve chamber with its bearing may likewise be identical with that previously described except that no sealing washer 72 is provided at the outlet end of the measuring chamber. The piston 148 may likewise be identical with any of those previously described except that the open end of the piston 148 is provided with a notch 150 connecting the interior of the hollow piston with the passageway 152 even when the piston 148 is pressed firmly against the plug 78a by the lubricant pressure.

The piston 148 controls communication between the measuring chamber 146 and the passageway 154 leading to the cylinder 156 of a signaling device. A piston 158 is reciprocably mounted in the cylinder 156 and has a reduced extension 160 terminating in a button 162. A threaded cap 164 closes one end of the cylinder 156 and limits outward movement of the piston 158.

While piston 148 and measuring valve chamber 146 may be identical with the other pistons and measuring valve chambers except for the omission of the sealing gasket 72 and the provision of the notch 150, I preferably provide means to prevent the piston 148 from assuming a position in which the groove 152 would be in registry with the passage 154 leading to the signaling device. As best shown in Figure 3, I have shown the measuring chamber 146 as being provided with a spline 154 located in a groove communicating with the measuring valve chamber. The spline 154 is slidably received in the groove 152 of the piston 148 and prevents rotation of the piston 148 about its axis. The groove 152 is made slightly larger than the grooves in the other pistons so that a restricted passageway is formed between the bottom of the groove 152 and the spline 154 and the restricted passageway thus formed has the same characteristics as the restricted passageways in the other pistons.

In Figure 4 I have shown a modified arrangement for preventing rotation of the piston. In this embodiment the piston 164 is held against rotation by a screw 166 having a needle-like end extending into the groove 168 in the piston.

If desired, all of the measuring valves may be provided with means like that shown in either Figure 3 or Figure 4 to prevent rotation of the measuring valve pistons. Such a construction would have the advantage of preventing the restricted passages or grooves in the pistons from coming in registry with the inlets for the succeeding measuring valves. However, it is seldom that such registration occurs and even where such registration does occur in one or two measuring valves, the operation of the system is not impaired. It is therefore ordinarily unnecessary to provide means like that shown in Figures 3 and 4 for any of the measuring valves except the last measuring valve and in some instances I find it unnecessary to provide such means even on the last measuring valve.

In the operation of my lubricating system, the operator first pushes on the button 162 of the signaling device to make certain that the piston 158 is in its innermost or right-hand position as viewed in Figure 2. The operator then connects a lubricant compressor to the inlet nipple 28 and operates the compressor to force grease into the nipple. The in-flowing grease will create a pressure in the strainer chamber 22 and passageways 54 and 56 until the resistance of spring 62 is overcome by the lubricant pressure acting on the exposed end of the valve 68. In practice, I preferably proportion the spring 62 to the exposed area of the valve so that a lubricant pressure on the order of 2000 pounds per square inch is required to move the piston 60 and open the valve at the inlet end of the measuring chamber. As soon as this valve is open, the entire closed end of the piston is exposed to the lubricant pressure and the pressure required to overcome the resistance of the spring 62 drops to approximately 25 pounds per square inch.

The full pressure developed by the lubricant compressor acting over the entire area of the piston 60 is now available to move the piston toward the gasket 72 and to force lubricant behind the piston past the outlet check valve 80 and toward the bearing 90. The groove 74 in the piston 60 offers such resistance to the flow of lubricant therethrough that practically no flow of lubricant along this groove occurs during this stroke of the piston. Just before the piston completes its operative stroke, it uncovers the inlet 100 for the next measuring valve chamber 102 and thereafter the 2000 pounds per square inch pressure required to open the valve 108 is the maximum pressure available to complete the operative stroke of the piston 60 and force it into sealing engagement with the gasket 72. This, however, is unimportant, since 2000 pounds lubricant pressure is greatly in excess of the pressure ordinarily required to complete the stroke of the piston.

When the piston 60 seals against the gasket 72, the pressure again rises to the approximately 2000 pounds required to open the valve 108. As soon as this valve is open and the piston 104 starts its operative stroke, the pressure required to move the piston 104 against the resistance of its spring 106 drops to approximately 25 pounds per square inch and all pressure in excess of this amount is available for forcing lubricant behind the piston toward the bearing connected to the conduit 110.

The operator continues to manipulate the lubricant compressor to force lubricant through the inlet nipple 28 until all of the measuring valves have been operated successively to supply their respective bearings with the proper quantities of lubricant. In each instance, the lubricant supplied to an individual bearing is determined by the stroke of the piston of the corresponding measuring valve and any desired stroke can be obtained by using a piston of the appropriate length. As the springs of the measuring valve pistons are compressed, these springs offer slightly increased resistance to the operative strokes of their respective pistons, but in no instance does this resistance require a lubricant pressure in excess of 35 pounds per square inch to overcome it.

When the piston 148 of the last measuring valve has completed its operative stroke, the passage 154 to the cylinder 156 of the signaling device is uncovered and lubricant entering the cylinder 154 urges the piston 158 to the left, as viewed in Figure 2. When the operator sees that the button 162 has been moved outwardly to the limit of its movement, he disconnects the lubricant compressor from the inlet nipple 28 and pushes on the button 162 to force the piston 158 to the right, as viewed in Figure 2. The lubricant displaced from the cylinder 156 passes into the measuring valve chamber 146, through groove 152 and notch 150 to the outlet end of the measuring valve chamber and thence to the bearing connected to this measuring valve.

The operator then releases the button 162 which, with its associated piston 158, then becomes free to move outwardly and relieve the pressure on the lubricant in the system. Thereupon the springs in the several measuring valves return their pistons and as these pistons return the lubricant ahead of them by-passes the pistons by way of the restricted passageways provided by the groove in each piston. It will be noted that the ball check valve 32 in the inlet nipple 28 prevents the loss of any lubricant from the system through this inlet nipple. After the pistons of the measuring valves have returned to close the inlets of the measuring valve chambers, the lubricating system is in condition for a subsequent operation.

It will be noted that, by forming all of the measuring valve chambers in a single casting, these chambers retain their exact relative relationships regardless of the manner in which connections are formed when the outlet ends of the measuring valve chambers are connected to the machine bearings. The connections between the outlets of the measuring valve chambers and the bearings therefore have little or no effect on the operation of the lubricating system and these connections may be installed by persons not especially skilled in the design and installation of centralized lubricating systems.

In the particular embodiment illustrated, there are seven measuring valve chambers in the casting 10. It is to be understood that my invention is not limited to any specific number of measuring valve chambers and that I contemplate the manufacture and sale of castings having different numbers of measuring valve chambers.

An important feature of my invention lies in the interchangeability of the parts and the fact that a relatively few different parts can be utilized to assemble an almost infinite variety of variant lubricating systems.

My invention may assume various forms in addition to that illustrated and disclosed herein, and is not to be construed as limited to the details of the particular form shown.

What I claim and desire to secure by United States Letters Patent is:

1. In a progressive centralized lubricating system of the class described, the combination of a plurality of measuring valves adapted to be operated in sequence, a lubricant inlet through which said measuring valves are supplied with lubricant, a signal device for indicating the operation of the last operating measuring valve, and manually operated means provided by said signal device and last-named measuring valve for relieving lubricant pressure in said measuring valves.

2. A progressive centralized lubricating system, comprising a plurality of measuring valves connected for operation in sequence, a lubricant inlet for said system, each measuring valve including a piston and a spring for urging its piston toward the inlet end of its measuring valve, a conduit connecting the discharge end of each measuring valve with a bearing requiring lubrication, a restricted passage provided by each piston forming a by-pass around the same, means at the outlet end of each measuring valve except the last for cutting off communication between such passage and the conduit connecting the measuring valve to its bearing, a signal device connected to the last measuring valve and adapted to receive lubricant therefrom, and means for operating said signal device to force lubricant through said last measuring valve to its bearing and to relieve lubricant pressure in all of said measuring valves.

3. In a centralized lubricating system, the combination of a lubricant inlet, a measuring valve chamber having its inlet end communicating with said inlet, a piston reciprocable in said measuring valve chamber, a spring for urging said piston toward the inlet end of said chamber, said chamber having an outlet end adapted for connection to a bearing, a conduit connecting the outlet end of said chamber with a bearing requiring lubrication, and a valve carried by said piston for closing the inlet end of said chamber, said valve being spaced from the wall of said cylinder and movable laterally of said piston to effectively seal with said inlet irrespective of axial misalignment between said inlet and piston.

4. A header block adapted to form part of a centralized lubricating system and providing a lubricant inlet, a plurality of measuring valve chambers connected for sequential operation of the measuring valves thereof, alternate measuring valve chambers having axes extending in one direction and the other measuring valve chambers having axes substantially perpendicular to said first-mentioned axes, and a plurality of outlets adapted to be connected to bearings requiring lubrication, each outlet being connected to said inlet through at least one measuring valve chamber whereby the exact relationships between all of the measuring valve chambers in the system are maintained independent of the connections between these measuring valves and the bearings lubricated thereby.

ERNEST W. DAVIS.